United States Patent [19]

Burin et al.

[11] 4,118,446

[45] Oct. 3, 1978

[54] VALVE TRAY FOR MASS-EXCHANGE APPARATUS

[76] Inventors: Viktor Leontievich Burin, ulitsa Derevyanko, 21a, kv. 26; Anatoly Borisovich Tjutjunnikov, ulitsa Frunze, 17, kv. 34; Viktor Nikolaevich Golosov, ulitsa Sverdlova, 190/9, kv. 53; Evgeny Konstantinovich Tarynin, ulitsa Otakara Yarosha, 41, kv. 17, all of Kharkov; Nikolai Pavlovich Pogorely, Kharkovskoi oblasti, pereulok Merefyansky, 41, Merefa; Vladimir Matveevich Lukyanenko, ulitsa Levanevskogo, 8, kv. 39, Sumy, all of U.S.S.R.

[21] Appl. No.: 502,231

[22] Filed: Aug. 30, 1974

[51] Int. Cl.² ............................................. B01D 3/18
[52] U.S. Cl. ............................................. 261/114 VT
[58] Field of Search ............ 261/114 VT; 137/527.8, 137/533.17, 533.21, 533.31

[56] References Cited

U.S. PATENT DOCUMENTS

| | | | |
|---|---|---|---|
| 2,718,900 | 9/1955 | Nutter | 261/114 VT |
| 2,772,080 | 11/1956 | Huggins et al. | 261/114 VT |
| 2,846,204 | 8/1958 | Gilmore | 261/114 VT |
| 2,951,691 | 9/1960 | Nutter | 261/114 VT |
| 2,979,316 | 4/1961 | Houston, Jr. | 261/114 VT |
| 3,325,155 | 6/1967 | Bahout | 261/114 VT |
| 3,770,255 | 11/1973 | Nutter | 261/114 VT |

FOREIGN PATENT DOCUMENTS

| | | | |
|---|---|---|---|
| 232,482 | 7/1964 | Austria | 261/114 VT |
| 1,237,299 | 6/1960 | France | 261/114 JP |
| 258,266 | 10/1970 | U.S.S.R. | 261/114 VT |

*Primary Examiner*—Frank W. Lutter
*Assistant Examiner*—Gregory N. Clements
*Attorney, Agent, or Firm*—Steinberg & Blake

[57] ABSTRACT

The valve tray for mass-exchange apparatus is essentially a baseplate with holes for the gas stream to pass, which holes are adapted to be shut up with valves. The valves have a seating plate protruding on one side beyond the hole being shut up, said seating plate being so curved as to have a cylindrical cross-sectional shape, with the bulging portion facing the tray baseplate so as to ensure that the initial phase of valve opening occurs by way of the seating plate rolling over the baseplate.

9 Claims, 10 Drawing Figures

VALVE TRAY FOR MASS-EXCHANGE APPARATUS

This invention relates generally to equipment adapted for carrying out heat- and mass-exchange processes between liquid and gas, and has particular reference to valve trays for mass-exchange apparatus. The herein-proposed valve tray can find most extensive application in column-type apparatus for carrying out the processes of distillation, rectification and absorption in chemical, petrochemical and some other branches of engineering industries.

Prior-art valve trays for mass-exchange apparatus are known to use (cf. U.S. Pat. No. 2,951,691), a baseplate having rectangular holes over which are provided plate valves of the same shape fitted with valve guards.

The tray is provided with overflow devices to receive the liquid from a superjacent tray and feed it onto a subjacent tray. The centre of gravity of a valve is offset with respect to the centre of the hole in the tray so that the valve opens towards the liquid overflow device.

Said valve tray functions as follows.

An ascending flow of gas (steam) causes the valve to open. Due to the offset position of the valve centre of gravity with respect to the centre of the hole in the tray baseplate, a unilateral opening of the valve occurs at the initial moment of its operation. As a result, under the action of the pressure exerted by the gas stream the valve turns round the larger edge until the valve guards thrust against the tray baseplate. In this case the stream of gas (steam) escaping from under the valve, is directed towards the liquid over-flow device so as to contact the liquid fed onto the tray from the over-flow device, thus resulting in more intense motion of the liquid over the tray.

With further increase in the amount of gas (steam), the valve reaches its full lift above the tray and assumes thus a horizontal position. Gas (steam) escaping from the ports on both sides of the valve, bubbles through the layer of the liquid moving over the tray.

There are also known purely uniflow valve trays, wherein the valves feature unilateral opening only (cf., e.g., USSR Inventor's Certificate No. 181,037). Such trays likewise comprise a baseplate with rectangular holes shut up with rectangular plate valves. A plate valve has its axis of rotation coinciding with the larger valve edge and held on the tray baseplate, whereby the valve features a unilateral opening.

However, both of the valve designs discussed above have such a feature that, in a unilaterally opening valve, its opening moment decreases. Thus the valve opens at an almost permanent loss of pressure thereon. Such a manner of pressure loss variation results in stepwise valve opening, i.e., the valve assumes only its extreme positions, viz., open or closed. This reduces regulating capability of the valves.

Under low gas (steam) loads or high liquid loads, part of the valves of the tray (mostly those located at the place of admission of the liquid therein) remains closed, whereby the effective area of the tray is reduced and its efficiency is affected.

Said disadvantage is partially overcome in trays with ballast valves, such as, say, the "Gleatch" type ballast valve (cf. U.S. Pat. No. 3,037,754). The valve tray according to said patent comprises a baseplate provided with circular holes arranged staggerwise, with valves located in their guards to shut up the holes in the tray.

The valves are of the plate-type, provided with a ballast plate which is spaced somewhat above each valve in the guard thereof and is free to move upwards.

The closing force is increased in said valves by increasing the weight of the valves as it is opening. First the valve plate is urged to lift till thrusting against the ballast plate under the effect of gas stream emerging from the tray baseplate; furthermore, the valve keeps opening together with the ballast plate so that valve opening occurs at a considerably greater loss in pressure, this being due to ever-increased valve weight. While opening the valves first assume the position on the tray, wherein they thrust against the ballast plate, whereupon, as the gas flow velocity increases, the valves assume their topmost position in which the ballast plate rests against the valve guard. Thereby the free area of the tray can be controlled more smoothly and the operation of the tray is thus improved.

However, the stepwise (discrete) variation in the loss of pressure applied to the valve results in a similar stepwise control of the free tray area. An increase in the number of ballast plates used would of course improve the regulating capability of the valves but such a feature will inescapably complicate the entire construction. Moreover, such contact trays cause much loss in pressure, so that they have not been extensively employed in vacuum technique.

It is a primary object of the present invention to enchance the efficiency and stability of operation of a valve tray within a broad range of liquid or gas (steam) loads.

It is another object of the present invention to reduce loss in pressure applied to the valve tray so as to enable the latter to be widely used in vacuum technique.

Said objects are attained due to the fact that in a valve tray for mass-exchange apparatus, made essentially as a baseplate with the holes for gas stream to pass, which holes are shut up by valves provided with guards, according to the invention each valve has a seat which protrudes from one of the sides thereof beyond the hole being shut up and is so curved as to be cylindrical in cross-section, bulging towards the baseplate, with the result that the initial phase of valve opening occurs due to the seat rolling over the baseplate.

It is expedient to make the valve of the plate-type and to curve the entire plate so that is assumes a cylindrical cross-sectional shape, bulging towards the baseplate.

It is also reasonable that the baseplate portion interacting with the valve seating plate be curved down at an angle so that it has a common tangent line at the point of contact with the valve when the latter is closed.

The recurved baseplate portion interacting with the valve seating plate may have holes for gas to pass through.

The baseplate portion interacting with the valve seating plate may be sunk with respect to the rest of the baseplate so that, with the valve closed, its seating plate does not project beyond the tray baseplate.

The proposed valve tray features high efficiency within a broad range of liquid and gas loads, high reliability and a wide range of control of the tray free area.

The valve tray ensures low hydraulic losses in gas (steam) pressure. Due to the initial axis of valve plate rotation being arranged at the valve centre, the tray features low initial pressure losses whatever the valve specific gravitational load which enables the tray to be used in vacuum technique.

With further valve opening, pressure losses are likewise reduced due to the provision of holes in the baseplate portion interacting with the valve seating plate, adapted to contribute to the valve lifting, which enables the proposed construction of valve tray to be employed in vacuum technique.

The proposed construction of valve tray makes it possible to ensure that the pressure loss variation thereon follows predetermined calculations by altering the curvature of the seating plate of the valves thereof.

The valves of the proposed tray enable stepless control of the free tray area.

In what follows the invention is illustrated by a description of exemplary embodiments thereof with reference to the accompanying drawings, wherein.

Figure 1:
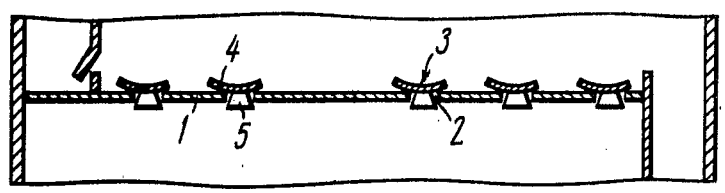
FIG. 1 is a diagrammatic longitudinal section view of a valve-type contact tray as set in a mass-exchange apparatus, according to the invention.

According to the invention the valve-type contact tray for mass-exchange apparatus is essentially a baseplate 1 (FIG. 1) with holes 2 for gas or steam to pass. The holes 2 may be rectangular, circular or of any other shape; they are shut by valves 3 shaped so as to suit the shape of the respective holes 2. The valve 3 has a seating plate 4 projecting on one side of the hole and so curved as to have a cylindrical cross section, bulging towards the baseplate 1 to ensure that the initial phase of opening the valve 3 occurs due to the seating plate 4 rolling over the baseplate 1. The valve 3 is provided with a guard 5.

The longitudinal section of the valve 3 may be of any shape to suit every particular requirements imposed upon the construction thereof. It is by appropriately varying the shape and curvature of the valve and its seating plate that a variety of relationships between the mode of valve opening and gas or stream velocity may be obtained.

Figure 2:
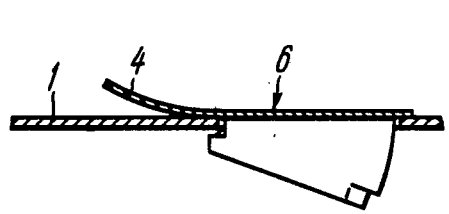
FIG. 2 is a longitudinal section view of a valve of the valve-type contact tray when closed, according to the invention.
Figure 3:
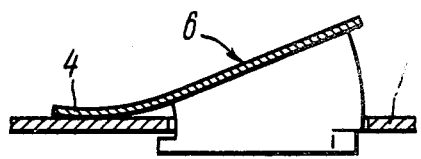
FIG. 3 is a longitudinal section view of a valve of the valve-type contact tray when open, according to the invention.

To ensure a directional flow of a gas-liquid mixture along the tray baseplate 1, a direct-flow plate valve is expedient to be used as a valve 6 in FIGS. 2 and 3.

Figure 4:
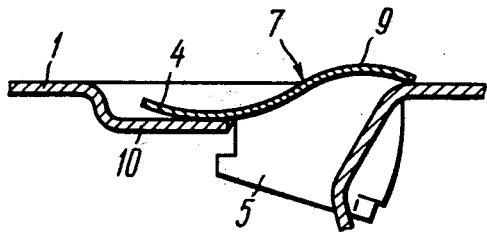
FIGS. 4, 5 illustrate different embodiments of a valve of the valve-type contact tray, according to the invention.

To provide better directivity of the gas-liquid stream along the baseplate 1, it is expedient to provide a valve 7 (FIG. 4) which has apart from a bulging portion of the seating plate 4, one more bulging portion 9 raised above the baseplate 1.

Figure 5:
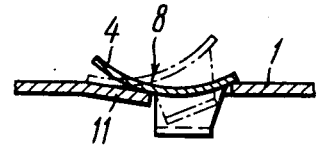

The entire valve plate together with its seating plate may be so curved as to have a cylindrical shape with the bulging portion facing the baseplate 1 as in a valve 8 (FIG. 5).

The valve 8 is advantageous in that at the initial moment of its opening the axis of rotation is displaced towards the valve 8 which ensures low hydraulic losses on the tray at the initial moment of opening the valves 8. Besides, the valve 8 is simple to manufacture.

In order that the seating plate 4 of the valve 7 (FIG. 4) not protrude above the surface of the tray baseplate 1 and not interfere with the flow of the gas-liquid mixture along the baseplate 1, a portion 10 of the baseplate, that interacts with the seating plate 4 of the valve 7, is sunk with respect to the rest of the baseplate 1 so that with the valve 7 closed the seating plate 4 does not protrude beyond the tray baseplate 1.

To ensure that the valve 8 (FIG. 5) reliably rolls over the tray baseplate 1, a portion 11 of the baseplate 1 that interacts with the seating plate 4 is curved down at an angle so as to have a common tangent line at the point of contact thereof with the valve 8 when the latter is closed. In this case the valve may be made as the portion of a cylinder. This construction achieves large angle of slope of the gas stream emerging from under the valve 8, with respect to the plane of the tray baseplate 1 and results to higher tray efficiency when operating under bubbling conditions.

Figure 7:
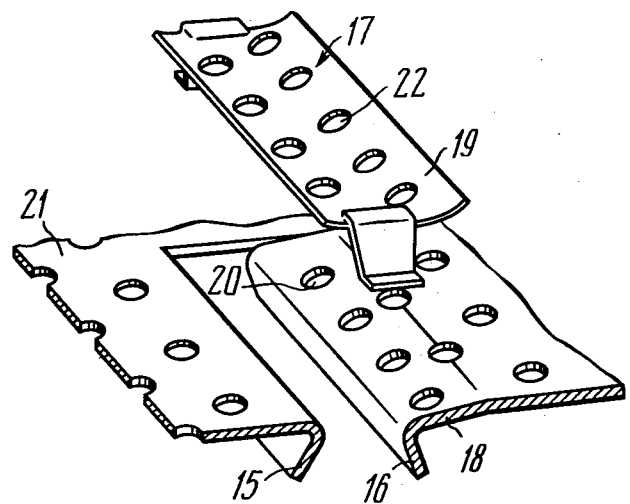
FIG. 7 is a general diagrammatic view of an embodiment of the tray valve when dismantled, according to the invention.
Figure 6:
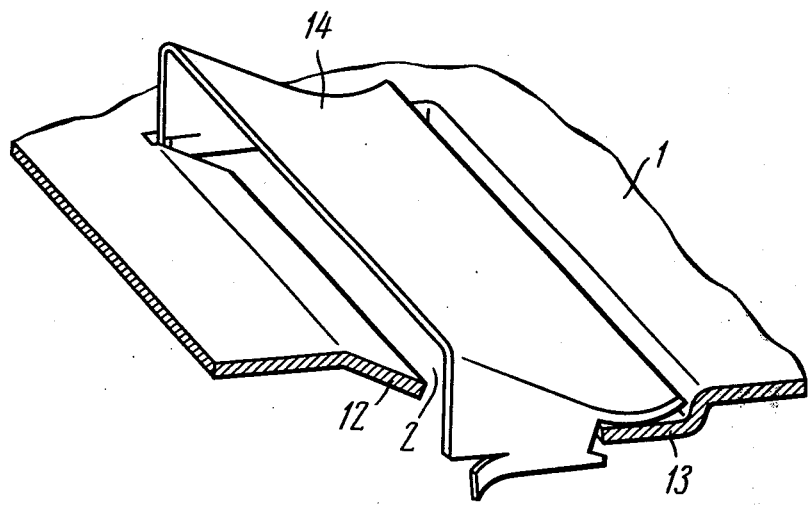
FIG. 6 is a general diagrammatic view of a plate-valve with a cylindrical seating plate, according to the invention.
Figure 8:
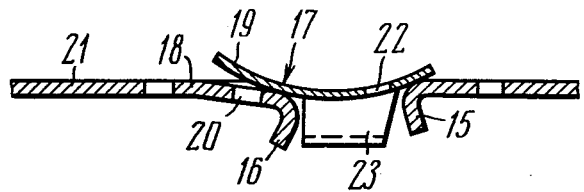
FIGS. 8, 9, 10 illustrate the operational sequence of the valve of FIG. 7.
Figure 9:
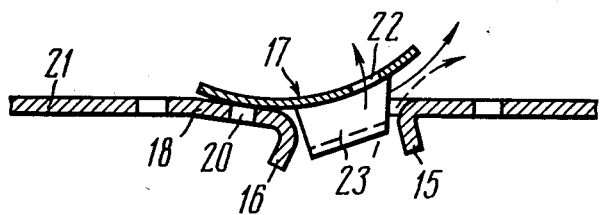
Figure 10:
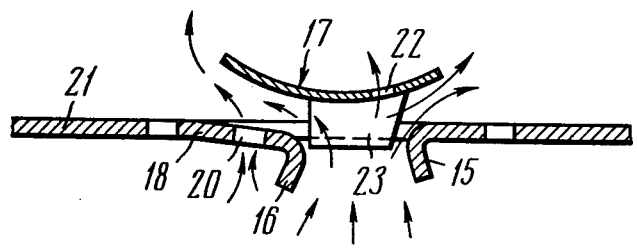

To reduce pressure losses, an edge 12 (FIG. 6) of the hole 2 opposite to a seating plate 13 over which a valve 14 rolls, is flanged down. For the same purpose both opposite edges of the hole shut up by the valve may be flanged down as edges 15 and 16 (FIG. 7) of a hole shut up by a valve 17. Said flanged down edges 15 and 16 establish, in a longitudinal section, an effusion, whereby pressure losses of the gas stream on the valve 17 are reduced. To reduce pressure losses still more and facilitate opening of the valve 17, a recurved portion 18 of the tray baseplate adapted to interact with a seating plate portion 19 of the valve 17, is provided with holes 20 through which gas flows and urges the valve 17 to lift and open bilaterally as shown in FIGS. 8 to 10. By varying the cross-sectional area of the holes 20 one can vary the characteristics of the valve 17. Owing to its low frictional head this valve construction is applicable for combination-type valve-and-sieve trays. In this case the holes for the valves 17 are made in a perforated tray baseplate 21. To increase the tray free area and make it more efficient due to elimination of stagnation zones, the valves 17 are likewise made with perforations 22. Besides, the valves 17 have guards 23.

The afore-discussed valve-and-sieve trays are adapted to be used in vacuum column apparatus, wherein the principal requirements imposed thereupon are a large free area of a tray and low hydraulic losses.

The herein-proposed valve tray incorporated in a mass-exchange apparatus, functions as follows.

Under low gas loads the valves 3 (FIG. 1) are closed, and the gas passes through gaps left between the edges of the holes 2 and the valves 3. Liquid fed onto the tray baseplate 1 flows over the baseplate 1 in a low-aerated stream. The valves 3 start opening when the moment of pressure forces applied to the valve 3 overpasses the moment of gravitational forces of the valve 3.

As the valve 3 is opening it rolls over the tray baseplate 1 so that the axis of rotation of the valve 3 moves away from the centre thereof towards its periphery, and the closing moment is therefore increased. Thus, owing to a curvilinear shape of the seating plate 4 the valve 3 has a displaceable axis of rotation and variable closing moment. As a result, pressure loss on the valve 3 increases as the latter opens.

The bilaterally opening valves 17 (FIGS. 8 to 10) operate as direct-flow valves under low gas loads, their unilateral opening occurring in the same way. With an increase in the gas load the valve 17 opens under the effect of gas pressure while rolling over the tray baseplate 21 until its guards 23 reach the baseplate 21 as shown in FIG. 9. With further increase in the gas velocity the valve 17 is turned in the reverse direction to assume a horizontal position as shown in FIG. 10.

In case of a bilateral valve opening gas excapes from under the valve 17 on both sides thereof, so that gas streams are directed in the opposite directions. The resultant of the velocities of said streams is directed towards the overflow of the liquid from the tray baseplate 1.

Defining constructionally a certain initial position of the valve axis of rotation, area of the holes under the seating plate and the valve weight, one can obtain a preset variation of pressure losses on the valve which ensures low hydraulic pressure losses on the tray and a wide range of its stable operation.

Besides, a cylindrical shape of valve cross-sectional area which exerts influence upon the angle of slope of the initial gas stream emerging from the valve, makes it possible to control the flow velocity of the gas-liquid mixture which passes over the tray, without altering the number of the valves in the latter.

Thus, it will be seen that with all of the embodiments of the invention the baseplate 1 is formed with a plurality of holes 2 through which an upwardly flowing fluid is adapted to move in countercurrent to a downwardly flowing liquid. These holes 2 are normally closed by the valves of the invention, and all of these valves 3, 6, 7, 8, 14 and 17 have in common the features of engaging the baseplate 1 along one side of each hole 2 thereof with an elongated opening-and-closing edge region which has its entire length in engagement with the baseplate when the valve is in a closed position, this opening-and-closing edge region being the part of the valve which moves upwardly away from the baseplate at least during the initial opening movement of the valve. At its opposite side each valve has in engagement with an opposite elongated surface portion of the base plate adjacent each of its openings 2 an elongated rocking edge region which remains in engagement with the baseplate at least during the initial opening movement of each valve. This rocking edge region 4 or 19 has directed downwardly toward the baseplate a surface of convex curvature and of relatively large radius providing for the valve when it is in its closed position a turning axis which is relatively close to the center of gravity of each valve, the latter center of gravity being situated over the hole which is closed by each valve when it is in its closed position. The surface of the baseplate beneath the convex surface portion of each valve is substantially flat, with the result that when each valve moves initially away from its open position, the turning axis of each valve becomes gradually displaced to an increasing distance away from the center of gravity of each valve as the opening of each valve continues so that the valves of the invention have a travelling turning axis in the sense that the turning axis of each valve progressively moves increasingly away from the center of gravity of each valve as each valve continues to open to an increasing extent. The result is that the moment arm of the center of gravity of each valve with respect to the turning axis thereof as each valve continues to open progressively increases in length so that the force inherent in each valve for urging the latter toward its closed position continuously increases as the valve opens to an increasing degree. It is thus possible with the structure of the invention to control the manner in which each valve opens gradually in response to increasing upward fluid pressure. Of course, the extent of opening of each valve is limited by the guards 5 or 23 which form a limiting means operatively connected with each valve and cooperating with the baseplate for limiting the extent of opening movement of each valve while at the same time freeing each valve for rocking movement at its convex surface which provides the travelling turning axis with the increasing moment arm referred to above.

It is furthermore to be noted from FIGS. 7-10 that in an embodiment where the baseplate 21 is formed with apertures 20 passing therethrough, these apertures are located only in the immediate vicinity of the valve 17 which of course itself may be formed with the apertures 22 as illustrated. Thus between the holes of this particular embodiment the baseplate has unperforated areas inasmuch as the apertures 20 are situated only in the immediate vicinity of each valve 17. Of course, the invention includes additional features such as the depressed portions 10 shown in FIG. 4 defining in the baseplate 1 recesses which receive the curved portions 4 of the valves 7 so that the latter do not project undesirably above the baseplate 1. In addition, the baseplate can have the downwardly inclined portions 11, 12, or 18 each of which cooperates with the convexly curved rocking surface of the valve to achieve an enhanced rocking or rolling action, while in the embodiment of FIGS. 7-10 there are not only the apertures providing a sieve action but also the downwardly diverging edge portions 15 and 16 at each hole providing an enhanced flow for the upwardly moving fluid.

What is claimed is:

1. In a valve tray for a mass-exchange apparatus, a baseplate formed with a plurality of holes through which an upwardly moving fluid is adapted to pass in countercurrent to a downwardly flowing liquid, said baseplate having at each hole opposed upwardly directed surface portions extending along each hole, and a plurality of valves resting on said baseplate respectively over said holes thereof with each valve having on one side an elongated opening-and-closing edge region engaging along its entire length one of said upwardly directed surface portions at each hole of said baseplate when each valve is in its closed position, and each valve having opposite from its opening-and-closing edge region an elongated rocking region engaging along its entire length an upwardly directed surface portion of the baseplate opposite from the surface portion thereof at each hole which is engaged by the opening-and-closing edge region of each valve, each valve having a center of gravity situated over the hole which is closed by each valve when the latter is in its closed position, and said rocking region providing for each valve a turning axis situated at a given distance from the center of gravity of each valve when the latter is in its closed position, said rocking region of each valve having a downwardly directed convexly curved surface which in a plane normal to said turning axis is of a substantially cylindrical configuration and which displaces said turning axis away from said center of gravity to an increasing extent as each valve moves at said opening-and-closing edge region thereof upwardly away from said baseplate during continued opening movement of each valve in response to pressure of upwardly flowing fluid, whereby the moment arm with which the center of gravity of each valve acts to urge each valve back toward its closed position continuously increases with increased opening of each valve so that increased fluid pressures which open said valves to increasing degrees are accompanied by increasing closing moments tending to return the valves to their closed positions.

2. The combination of claim 1 and wherein a limiting means is operatively connected with each valve and cooperates with the baseplate for limiting the extent of opening movement of each valve without interfering with the rocking of each valve at said rocking region thereof during continued opening of each valve while the turning axis thereof becomes gradually displaced to an increasing extent away from the center of gravity of each valve.

3. The combination of claim 2 and wherein said limiting means coacts with said baseplate for limiting movement of said opening-and-closing edge region of each valve away from said baseplate while then forming a further turning axis around which each valve is adapted to turn in a direction opposite to its initial direction of turning during initial opening movement with said rocking region of each valve then moving upwardly from said baseplate to provide for flow of the upwardly moving fluid through said holes in opposed directions past the opposed upwardly directed surface portions of the baseplate at each opening thereof.

4. The combination of claim 1 and wherein said baseplate is formed at its upper surface with a plurality of recesses respectively receiving said rocking regions of said valve to minimize the extent to which said rocking regions project above the upper surface of said baseplate beyond said recesses thereof.

5. The combination of claim 1 and wherein said baseplate has in engagement with the rocking region of each valve a downwardly inclined portion inclined downwardly with respect to the remainder of the baseplate and extending tangentially with respect to the convexly curved surface of each valve to enhance the rocking movement thereof.

6. The combination of claim 1 and wherein said baseplate is formed only in the immediate vicinity of each valve with a plurality of apertures passing through the baseplate to provide at the baseplate the additional action of a sieve in the immediate vicinity of each valve.

7. The combination of claim 6 and wherein each valve is itself formed with a plurality of apertures passing therethrough.

8. The combination of claim 1 and wherein each valve is substantially uniformly curved from said opening-and-closing edge region thereof to said rocking region thereof and has an upwardly directed concave surface and a downwardly directed convex surface.

9. The combination of claim 1 and wherein said baseplate has along opposed edge regions of each opening opposed downwardly diverging portions, respectively, providing an enhanced flow for the upwardly moving fluid.

* * * * *